United States Patent
Mao

[11] Patent Number: 5,956,243
[45] Date of Patent: Sep. 21, 1999

[54] THREE-LEVEL BOOST RECTIFIER WITH VOLTAGE DOUBLING SWITCH

[75] Inventor: Hengchun Mao, Dallas, Tex.

[73] Assignee: Lucent Technologies, Inc., Murray Hill, N.J.

[21] Appl. No.: 09/133,067

[22] Filed: Aug. 12, 1998

[51] Int. Cl.[6] .............................. H02M 3/18; H02M 7/04
[52] U.S. Cl. ............................................. 363/61; 363/143
[58] Field of Search ................................... 363/65, 66, 67, 363/69, 61, 143; 307/109, 110, 536

[56] References Cited

U.S. PATENT DOCUMENTS 5,187,421  2/1993  Naito ........................................... 363/59
5,831,846  11/1998 Jiang ........................................... 363/125

*Primary Examiner*—Peter S. Wong
*Assistant Examiner*—Rajnikant B. Patel
*Attorney, Agent, or Firm*—Locke, Liddell & Sapp, LLP

[57] ABSTRACT

An three-level boost rectifier circuit is described for universal line applications. The boost rectifier circuit includes a boost inductor connected to the input voltage. A bridge rectifier composed of four diodes is connected between the boost inductor and two output capacitors. Two boost switches, each with two series diodes are connected between the bridge diodes and the output capacitors. A threshold switch is connected between the bridge diodes and the output capacitors. The threshold switch is closed when the input voltage is below a predetermined threshold voltage and opened when the input is above the threshold voltage. Closing the threshold switch acts to reverse bias two of the four bridge diodes, reducing the number of diodes conducting at any given moment to one. This reduces the conduction losses of the circuit at low input voltage, making the circuit more efficient at low-line inputs. Further, the configuration of the boost rectifier circuit of the present invention reduces the required voltage rating for the boost switches, making the boost switches more efficient when conducting current.

14 Claims, 4 Drawing Sheets

ACTIVE CIRCUIT OF FIG. 1 AT LOW LINE

ACTIVE CIRCUIT OF FIG. 1 AT HIGH LINE

CONTROL STRATEGY WHEN $|V_{in}| < V_o/2$

CONTROL STRATEGY WHEN $|V_{in}| < V_o/2$

THREE-LEVEL BOOST RECTIFIER WITH VOLTAGE DOUBLING SWITCH

This invention relates to boost rectifier circuits used for power conversion. More specifically, the invention relates to three-level boost rectifying circuit that includes a voltage doubling switch.

BACKGROUND OF THE INVENTION

Boost rectifiers are well known and widely used for universal ac line (e.g. 85–265 Vac) applications. Unfortunately, when the input voltage of boost rectifier circuit is at its low-line conditions (e.g. 85–135 rms Vac) the power loss of the boost rectifier circuit is significantly higher than when the input voltage is at its high-line conditions (e.g. 170–265 rms Vac). This power loss results because of the high input current to the boost rectifier circuit and high switch duty cycle for the boost switch that result from the low-line input conditions. If MOSFETs are used as the boost switch, its conduction loss can be more than 40 times higher at an input of 85 rms Vac than at an input of 265 rms Vac. Further, the diode loss in the rectifier bridge is also very high at low line.

Voltage doubling circuits have been proposed to increase the efficiency of boost rectifiers by reducing the discharge voltage of the boost inductor at low line. This improved efficiency is accomplished by the use of relays which are switched between low-line and high-line conditions. Because the switch duty cycle is reduced the rms current of the switch in the boost doubler circuit is reduced compared to a conventional boost rectifier. However, losses at low-line inputs, though reduced, are still high compared to losses under high-line input conditions.

A boost rectifier circuit is needed to reduce losses at low-line input conditions and achieve improved efficiency.

SUMMARY OF THE INVENTION

In accordance with the present invention, a boost rectifier circuit is provided that has improved efficiency, especially at low-line conditions. The boost rectifier circuit includes a boost inductor connected to the input voltage. A bridge rectifier composed of four diodes is connected between the boost inductor and output capacitor, or output capacitors. Two boost switches, each with two series diodes are connected between the bridge diodes and the output capacitor. A threshold switch is connected between the bridge diodes and the output capacitor. The threshold switch is closed when the amplitude of the input voltage is below a predetermined threshold and opened when the amplitude of the input is above the threshold. The amplitude of the input voltage is a characteristic of the input waveform such as the rms voltage or the peak value. Closing the threshold switch acts to reverse bias two of the four bridge diodes, reducing the number of diodes conducting at any given moment to one. This reduces the conduction losses of the circuit at low input voltage, making the circuit more efficient at low-line inputs. Further, the configuration of the boost rectifier circuit of the present invention reduces the required voltage rating for the boost switches, making the boost switches more efficient when conducting current.

The features and advantages of the invention will become more readily understood from the following detailed description taken in conjunction with the appended claims and attached drawing wherein:

DESCRIPTION OF THE PREFERRED EMBODIMENTS

Figure 1:
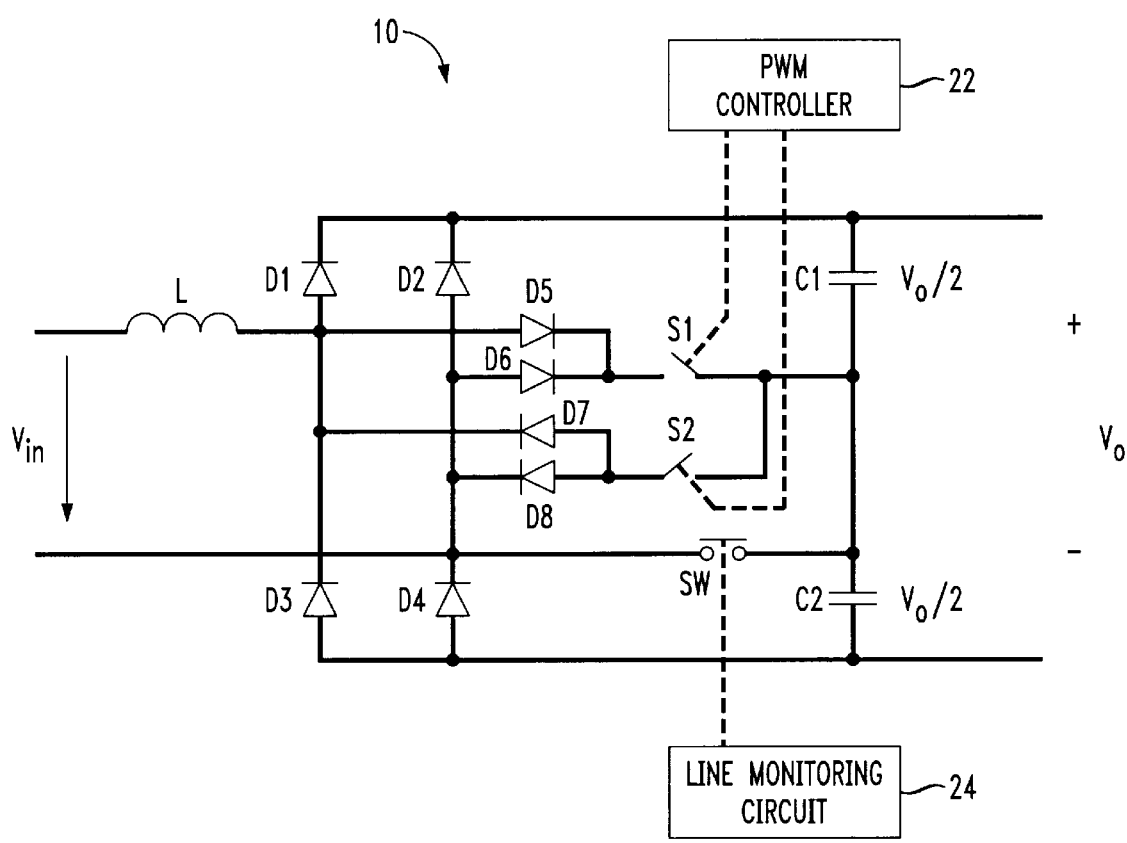
FIG. 1 is a circuit diagram of a three level boost rectifier with a voltage doubling switch according to the present invention.

Referring to FIG. 1, the preferred embodiment of the present invention is shown. Circuit 10 is used to produce a dc output voltage $V_o$ from input voltage $V_{in}$. $V_{in}$ is a universal ac line voltage which can be, for example, from 85 to 265 rms Vac. Diodes D1, D2, D3 and D4 form a full bridge rectifier and convert the ac input voltage $V_{in}$ to a rectified dc voltage. Boost switches S1 and S2 are used in conjunction with series diodes D5, D6, D7 and D8 to regulate output voltage $V_o$. Output voltage $V_o$ is developed across output capacitors C1 and C2. Though output capacitors C1 and C2 may be of different values, in the preferred embodiment output capacitors C1 and C2 are of equal values such that half the output voltage is developed across each of the output capacitors C1 and C2. Boost switches S1 and S2, which can be unidirectional switches, are controlled by a pulse width modulated controller (PWM) 22 which monitors output conditions and opens and closes boost switches S1 and S2 as necessary to maintain a constant output voltage despite varying current demands in the load.

Threshold switch SW is controlled by a line monitoring circuit 24 which closes switch SW when the amplitude of the input voltage is less than a predermined threshold, which can be approximately 150 rms Vac for input voltages in an 85–265 rms Vac circuit. Threshhold switch SW is then reopened for amplitudes of the input voltages above the predetermined threshold. The predetermined threshold used by line monitoring circuit 24 can be designed to include a dead zone. The dead zone causes threshold switch SW to be closed at a slightly lower amplitude than the amplitude at which it is opened, and opened at a slightly higher amplitude than the amplitude at which it is closed. Thus, the dead zone prevents unnecessary, or undesired switching as a result of small changes in the amplitude of the input voltage around the predetermined threshold.

Closing threshold switch SW acts to simplify circuit 10 during low-line conditions by reverse biasing, or bypassing, bridge diodes D2 an D4 when input voltage $V_{in}$ is between about 85 and 150 rms Vac, so that current flows in only one switch and/or one diode during low-line conditions. This is critical because of the high currents seen at low line conditions.

When threshold switch SW is open at high line conditions, circuit 10 can be controlled as either a two-level rectifier or as a three-level rectifier. As a two-level rectifier, circuit 10 controls boost switches S1 and S2 together. While operating as a three-level rectifier, however, circuit 10 operates S1 and S2 separately, again employing separate control schemes when threshold switch SW is on and off, but also, when threshold switch SW is off, dividing the amplitude of the input voltage into two ranges and employing separate control schemes for each of these ranges. For example, in the preferred embodiment when threshold switch SW is off, the three-level rectifier divides the amplitude of the input voltage into a control mode 1 where $|V_{in}|<V_o/2$, and control mode 2 where $|V_{in}|>V_o/2$. Therefore, control mode 1 occurs when threshold switch SW is open and input voltage $|V_{in}|<V_o/2$, and control mode 2 occurs when threshold switch SW is open and input voltage $|V_{in}|>V_o/2$. The three-level rectifier scheme will be discussed in greater detail with respect to FIGS. 3(a) and 3(b).

Figure 2A:
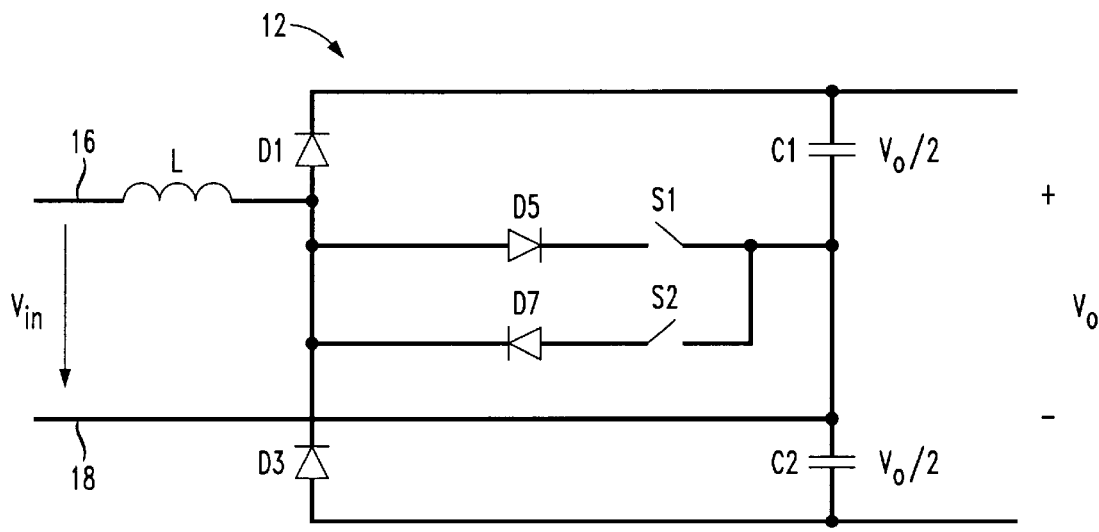
FIG. 2(a) is a circuit diagram of the circuit of FIG. 1 at low-line conditions when threshold switch SW from FIG. 1 is closed.

FIG. 2(a) shows low-line circuit 12. Low-line circuit 12 is the active portion of circuit 10 of FIG. 1 at low-line conditions when threshold switch SW from FIG. 1 is closed reverse biasing bridge diodes D2 and D4. In this state, boost switches S1 and S2 can be controlled together and are always in the identical on or off states in both the two-level and three-level rectifier configurations. The operation of low-line circuit 12 in FIG. 2(a) depends on the state of boost switches S1 and S2 and the polarity of input voltage $V_{in}$.

When boost switches S1 and S2 are closed, or "on", current flows through one of the output capacitors C1 and C2, and boost inductor L is charged. Though boost switches S1 and S2 are both closed only one switch will conduct at a time because of series diodes D5 and D7. Which switch is conducting is determined by the polarity of the input voltage $V_{in}$ and the input current. When $V_{in}$ is positive and boost switches S1 and S2 are closed, current flows in input terminal 16 through boost inductor L, series diode D5 and boost switch S1, and then back through input terminal 18 causing inductor L to charge. When $V_{in}$ is negative and boost switches S1 and S2 are closed current flows in input terminal 18 through boost switch S2 and series diode D7, and then back through boost inductor L and input terminal 16, again charging boost inductor L. Since only one switch conducts at any given time, a selection circuit can be added to turn on only the switch which will conduct while leaving the other switch open.

Losses while boost switches S1 and S2 are closed are much less for the present invention than conventional boost rectifiers because current always flows through only one switch and one diode. Further, switch losses are reduced since the switches need only have a voltage rating equivalent to $V_o/2$ instead of $V_o$ since the switches only see the voltage across either output capacitor C1 or C2 instead of both output capacitors C1 and C2. Lower voltage ratings for a switch mean lower switch resistance for a given switch size. Resistance in MOSFET switches, a widely used switch type in power converters, is approximately proportional to the square of the voltage rating. Therefore, reducing the voltage by half, as with the present invention, results in approximately one quarter the resistance of the higher rated switch.

When boost switches S1 and S2 are open, or "off", boost inductor L discharges with again only one diode conducting. The particular diode conducting, as before, depends on the polarization of $V_{in}$ and the resulting current through boost inductor L. When current in boost inductor L is positive, $V_{in}$ is positive, current flows in through input terminal 16 through boost inductor L, diode D1, output capacitor C1, and out through input terminal 18. When the current in boost inductor L is negative, $V_{in}$ is negative, current flows in through input terminal 18, through output capacitor C2, diode D3, and then out through boost inductor L and input terminal 16. As before, conduction losses are significantly lower than standard boost rectifiers since current flows through only one diode.

Conduction losses are much more critical during the low-line conditions described above than during high-line conditions. During low-line conditions the input voltage is between, for example, 85 and 135 rms Vac, maintaining the required power output forces a much higher current to flow in the rectifier, and much higher switch duty cycles than occur at high-line conditions. This high current results in much higher conduction losses through switches and diodes. The present invention, therefore, minimizes the number of switches and/or diodes conducting current at any particular moment, as well as minimizing the voltage rating of the switches, to minimize conduction losses during low-line conditions.

Figure 2B:
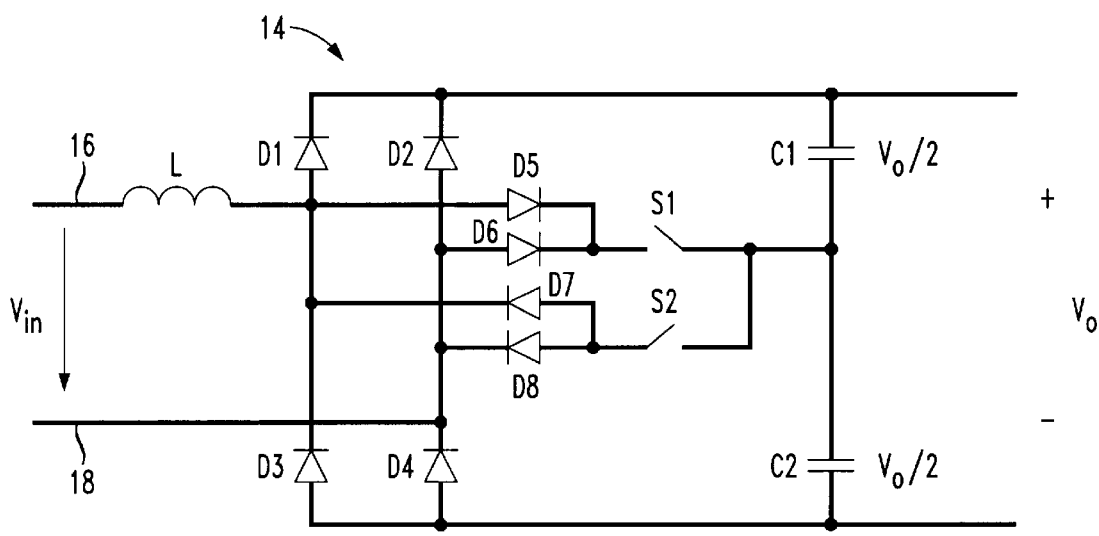
FIG. 2(b) is a circuit diagram of the circuit of FIG. 1 at high-line conditions when threshold switch SW from FIG. 1 is open.

FIG. 2(b) shows high-line circuit 14. High-line circuit 14 is the active portion of circuit 10 of FIG. 1 at high-line conditions when threshold switch SW from FIG. 1 is open. In this state, boost switches S1 and S2 can be controlled in such a manner as to make the boost rectifier circuit of the present invention to operate as either a two-level rectifier or as a three-level rectifier. For a two level rectifier configuration, boost switches S1 and S2 are controlled together. While in a three-level rectifier configuration, boost switches S1 and S2 are controlled separately, as will be discussed with respect to FIGS. 3(a) and 3(b). The two-level rectifier control scheme will be described with respect to the operation of high-line circuit 14 of FIG. 2(b).

When boost switches S1 and S2 are closed, or "on", boost inductor L is essentially shorted across input voltage $V_{in}$. Boost inductor L charges as the current flows through boost inductor L, one of series diodes D5 or D6 through boost switch S1 then boost switch S2 and back through one of series diodes D7 or D8. Current flows through series diodes D5 and D8 when $V_{in}$ is positive, and through series diodes D6 and D7 when $V_{in}$ is negative.

When boost switches S1 and S2 are open, boost inductor L discharges and output capacitors C1 and C2 are recharged. Current flows through boost inductor L, diode D1, output capacitors C1 and C2, and diode D4 when input voltage $V_{in}$ is positive. When input voltage $V_{in}$ is negative, current flows in through diode D2, through output capacitors C1 and C2, then diode D3, and out through boost inductor L.

Although current in high-line circuit 14 always flows through two diodes, when input voltage $V_{in}$ is high, current in high-line circuit is low, thereby reducing the effects of current losses through the diodes. High-line circuit 14 maintains the advantages low-line circuit 12 from FIG. 2(a) by only requiring a voltage rating of $V_o/2$ for boost switches S1 and S2.

Figure 3A:
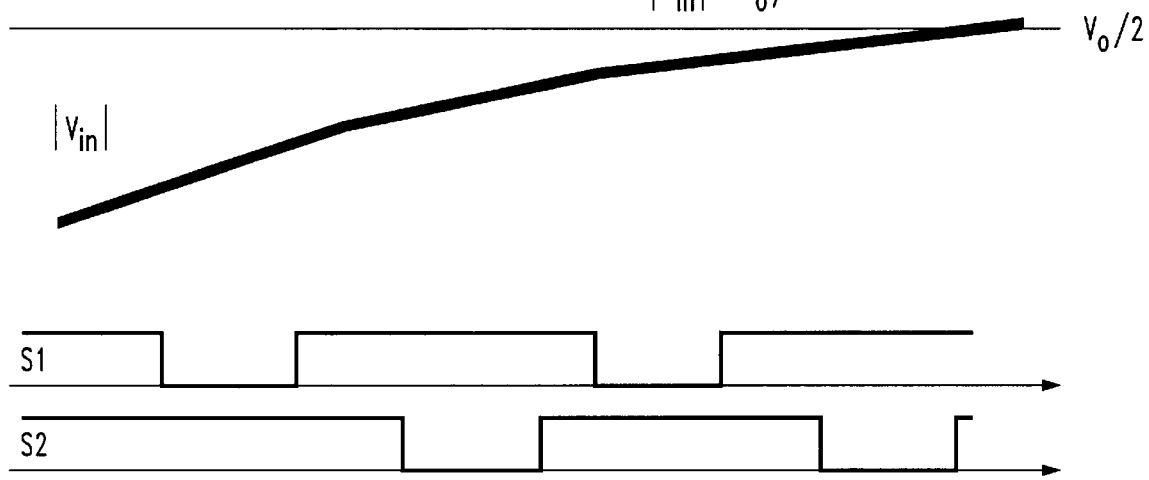
FIGS. 3(a) and (b) is a timing diagram of the control strategy for high-line conditions in a three-level rectifier control where (a) $|V_{in}|<V_o/2$, and (b) $|V_{in}|>V_o/2$, respectively.
Figure 3B:
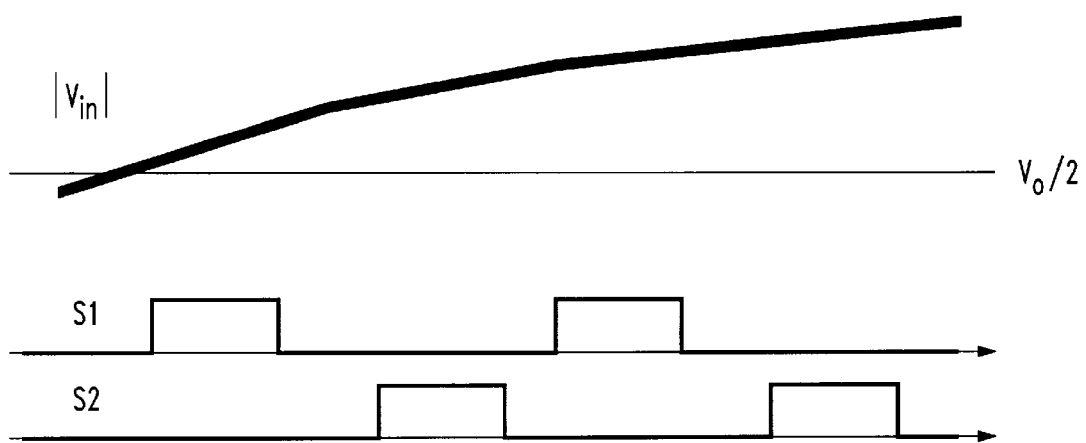

Referring now to FIGS. 3(a) and 3(b), the operation of boost switches S1 and S2 of circuit 10 from FIG. 1 can also be controlled in a three-level control scheme. In the three-level control scheme, the operation of the circuit when threshold switch SW is closed remains as discussed with respect to FIG. 2(a), however, the operation of the circuit with threshold switch SW open is split into two modes, and boost switches S1 and S2 are controlled separately instead of together.

Control mode 1 of the three-level control scheme is shown in FIG. 3(a). Control mode 1 occurs when threshold switch SW open and $|V_{in}|<V_o/2$. During these input conditions, boost switches S1 and S2 are both turned on in the inductor charging state causing circuit 10 to operate as described with respect to FIG. 2(b) with both switches closed. However, as can be seen in FIG. 3(a), boost switches S1 and S2 are turned off alternately in every switching cycle during the inductor discharge state. This increases the efficiency of circuit 10 over the two-level control scheme by limiting the voltage swing during discharge to only half of the output voltage.

Control mode 2 of the three-level control scheme is shown in FIG. 3(b). Control mode 2 occurs when threshold switch SW open and $|V_{in}|>V_o/2$. While the instantaneous input voltage is greater than $V_o/2$, boost switches S1 and S2 are turned on alternately in every other switching cycle for boost inductor L's charging state. Both boost switches S1 and S2 are turned off during boost inductor L's discharging state. The control scheme of control mode 2 is more efficient than the two-level control scheme during these input conditions because the low charging voltage achieved by only switching either boost switch S1 or boost switch S2 on to charge boost inductor L reduces current ripple.

While the three-level control scheme of FIGS. 3(a) and (b) is more efficient than the two-level control scheme discussed with respect to FIG. 2(b), the three level control scheme is more complicated and requires separate signals to drive boost switches S1 and S2. The two-level control scheme may be appropriate for applications where cost is an important factor and the slight increase in power loss is not critical.

Figure 4:
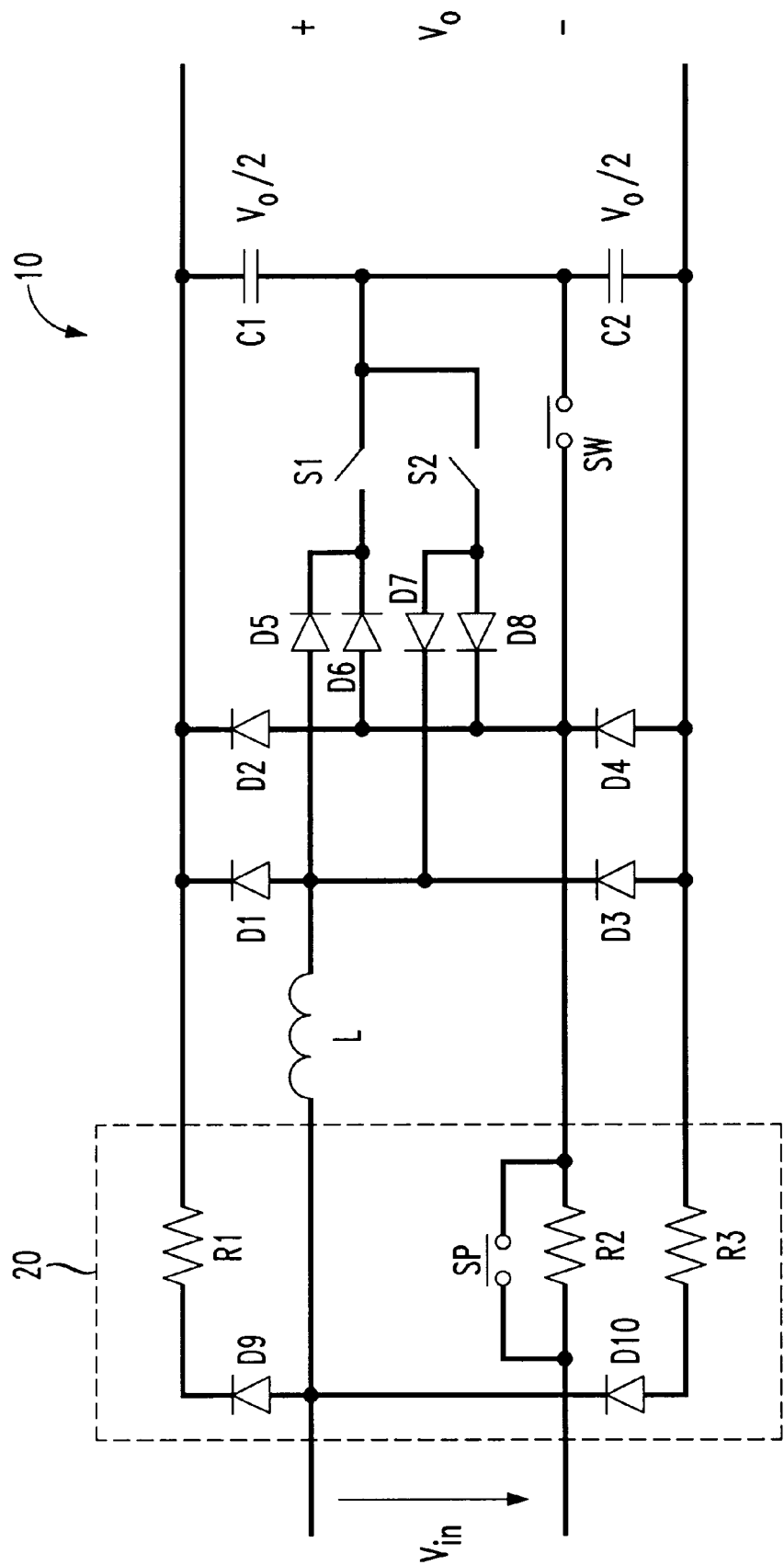
FIG. 4 is a circuit diagram of a three level boost rectifier according to the present invention with inrush and surge protection circuitry.

FIG. 4 shows circuit 10 of FIG. 1 with inrush and surge protection circuitry added at the input. Inrush and surge protection circuitry 20 is placed between input voltage $V_{in}$ and circuit 10. Switch SP is open at start-up allowing resistor R2 to prevent inrush currents that may occur before output capacitors C1 and C2, and boost inductor L are initially charged. Switch SP is then closed after a brief start-up delay, shorting resistor R2. Resistors R1 and R3 and diodes D9 and D10 also prevent inrush currents and also provide circuit 10 protection from surges and spikes in input voltage $V_{in}$. The rest of circuit 10 operates just as described with respect to FIGS. 1, 2 and 3.

All of the elements shown in FIGS. 1, 2, and 4 are standard electrical components, and are commonly available. The switches used can be any appropriate switch with a sufficient voltage ratings and switching speed, such as power MOSFETs or power IGBTs. The PWM controllers are also well known in the art, and could be any standard PWM controller.

The foregoing has outlined preferred and alternative features of the present invention so that those skilled in the art may better understand the detailed description of the invention. Those skilled in the art shall appreciate that they can readily use the disclosed conception and specific embodiment as a basis for designing or modifying other structures for carrying out the same purposes as the present invention. Those skilled in the art should also realize that such equivalent constructions do not depart from the spirit and scope of the present invention in its broadest form as defined by the appended claims.

What is claimed:

1. A boost rectifier for producing a dc output voltage from an input current generated by a power source, the boost rectifier comprising:
    a) a boost inductor connected to the power source;
    b) four bridge diodes connected to the boost inductor and the power source to rectify the ac input current from the power source;
    c) a first boost switch connected in series with a first and second series diodes which are connected to the bridge diodes, the boost switch regulating the dc output voltage;
    d) a second boost switch connected in series with a third and fourth series diodes and connected to the boost rectifier in the same manner as the first boost switch and the first and second series diodes;
    e) two output capacitors connected to the bridge diodes and the first and second boost switches, wherein the dc output voltage is developed across the two output capacitors; and
    f) a threshold switch connected between the two output capacitors and the bridge diodes, the threshold switch operable between a closed position when the amplitude of the input voltage is below a threshold and an open position when the amplitude of the input voltage is above the threshold, wherein the threshold switch when in the closed position reverse biases two of the bridge diodes, such that when the amplitude of the input voltage is below the threshold, no more than one diode in the boost rectifier is conducting current, and such that both the first and second boost switches are operable when the threshold switch is closed.

2. The boost rectifier of claim 1 wherein the boost switches operate in a first and second mode when the threshold switch is the open position forming a three-level boost rectifier.

3. The boost rectifier of claim 1 wherein the boost switches are opened and closed together in a simplified control scheme.

4. The boost rectifier of claim 1 wherein the output capacitors are of about the same value such that each develop about half of the output voltage.

5. The boost rectifier of claim 3 wherein the voltage ratings of the boost switches are approximately half the dc output voltage.

6. The boost rectifier of claim 1 wherein the input voltage of the power source is from about 85 to about 265 rms Vac, and the threshold is about 150 rms Vac.

7. A boost rectifier for producing a dc output voltage comprising:
    a) a boost inductor connected to a power source;
    b) four bridge diodes connected to the boost inductor and the power source to rectify the ac input current from the power source;
    c) two boost switches each in series with two series diodes which are connected to the bridge diodes, the boost switches regulating the dc output voltage and having a voltage rating of about half the dc output voltage;
    d) two output capacitors connected to the bridge diodes and the boost switch, wherein half the dc output voltage is developed across each of the output capacitors; and
    e) a threshold switch connected between the output capacitor and the bridge diodes, the threshold switch closed when the input voltage is below a threshold and open when the input voltage is above the threshold, wherein the threshold switch when closed reverse biasing two of the bridge diodes while both boost switches remain operable, such that when the input voltage is below the threshold, no more than one diode in the boost rectifier is conducting current.

8. The boost rectifier of claim 7 wherein the boost switches are opened and closed together causing the boost rectifier to be a two-level boost rectifier.

9. The boost rectifier of claim 7 wherein the boost switches are operated independently in a first and second mode when the threshold switch is open causing the boost rectifier to be a three-level boost rectifier.

10. The boost rectifier of claim 7 wherein the input voltage of the power source is from 85 to 265 rms Vac, and the threshold is about 150 rms Vac.

11. A method for operating a boost rectifier circuit comprising:

a) providing a boost inductor connected to a power source;
b) providing four bridge diodes connected to the boost inductor and the power source to rectify the ac input current from the power source;
c) providing two parallel boost switches each in series with two series diodes which are connected to the bridge diodes, the boost switches regulating the dc output voltage;
d) providing an output capacitor connected to the bridge diodes and the boost switch, wherein the dc output voltage is developed across the output capacitor;
e) providing a threshold switch connected between the output capacitor and the bridge diodes;
f) closing the threshold switch when the input voltage is below a threshold thereby reverse biasing two of the bridge diodes while both boost switches remain operable, such that when the input voltage is below the threshold, no more than one diode in the boost rectifier circuit is conducting current; and
g) opening the threshold switch when the input voltage is above the threshold.

12. The method of claim 11 wherein the boost switches are opened and closed together causing the boost rectifier circuit to be a two-level boost rectifier.

13. The method of claim 11 wherein the boost switches are operated seperately in a first and second mode when the threshold switch is open causing the boost rectifier circuit to be a three-level boost rectifier.

14. The method of claim 11 wherein the input voltage of the power source is from about 85 to about 265 rms Vac, and the threshold is about 150 rms Vac.

* * * * *